United States Patent [19]

Gary

[11] 4,347,914
[45] Sep. 7, 1982

[54] PORTABLE TREE SLING OR PORTABLE TREE STAND OR PORTABLE TREE HUNTING SLING, OR ALTERNATIVES THEREOF

[75] Inventor: David A. Gary, O'Donald, Tex.

[73] Assignee: Robert Sims, Brownfield, Tex.

[21] Appl. No.: 286,870

[22] Filed: Jul. 27, 1981

[51] Int. Cl.³ .................. A45F 3/26; A01M 31/02; A47C 9/10; A62B 1/00
[52] U.S. Cl. ........................................ 182/142; 182/7
[58] Field of Search ................. 182/3, 4, 5, 6, 7, 142, 182/150, 10, 187; 5/89

[56] References Cited

U.S. PATENT DOCUMENTS

| | | | |
|---|---|---|---|
| 305,100 | 9/1884 | Moore | 182/187 |
| 1,574,529 | 2/1926 | Abraham | 182/7 |
| 1,971,294 | 8/1934 | Bunker | 182/3 |
| 2,254,179 | 8/1941 | Hoyt | 182/7 |
| 2,829,702 | 4/1958 | Keating | 182/3 |
| 2,847,059 | 8/1958 | Klins | 182/187 |
| 2,851,085 | 9/1958 | Woodward | 182/187 |
| 3,568,797 | 3/1971 | Hardy | 182/142 |
| 3,731,762 | 5/1973 | Sirls | 182/150 |
| 4,103,758 | 8/1978 | Himmelrich | 182/7 |
| 4,205,733 | 6/1980 | Wade | 182/187 |

Primary Examiner—Reinaldo P. Machado
Attorney, Agent, or Firm—Diller, Ramik & Wight

[57] ABSTRACT

The invention is directed to a lightweight portable "tree stand" or hunting sling which is utilized to hoist a hunter appreciably above ground level and support the hunter thereat, the "tree stand" including a seat rest and a back rest of fabric material, the seat rest having a medial seat portion and opposite end portions to the latter of which are connected a foot rest in the form of a rope, means for adjustably connecting the seat portion of the seat rest to the back rest, the back rest having two upwardly directed spaced arms connected by ropes to a hoist while additional ropes connect the hoist to the arms of the seat rest, and another rope passing through openings of the back rest for manipulating the "tree stand" through 360 degrees.

26 Claims, 3 Drawing Figures

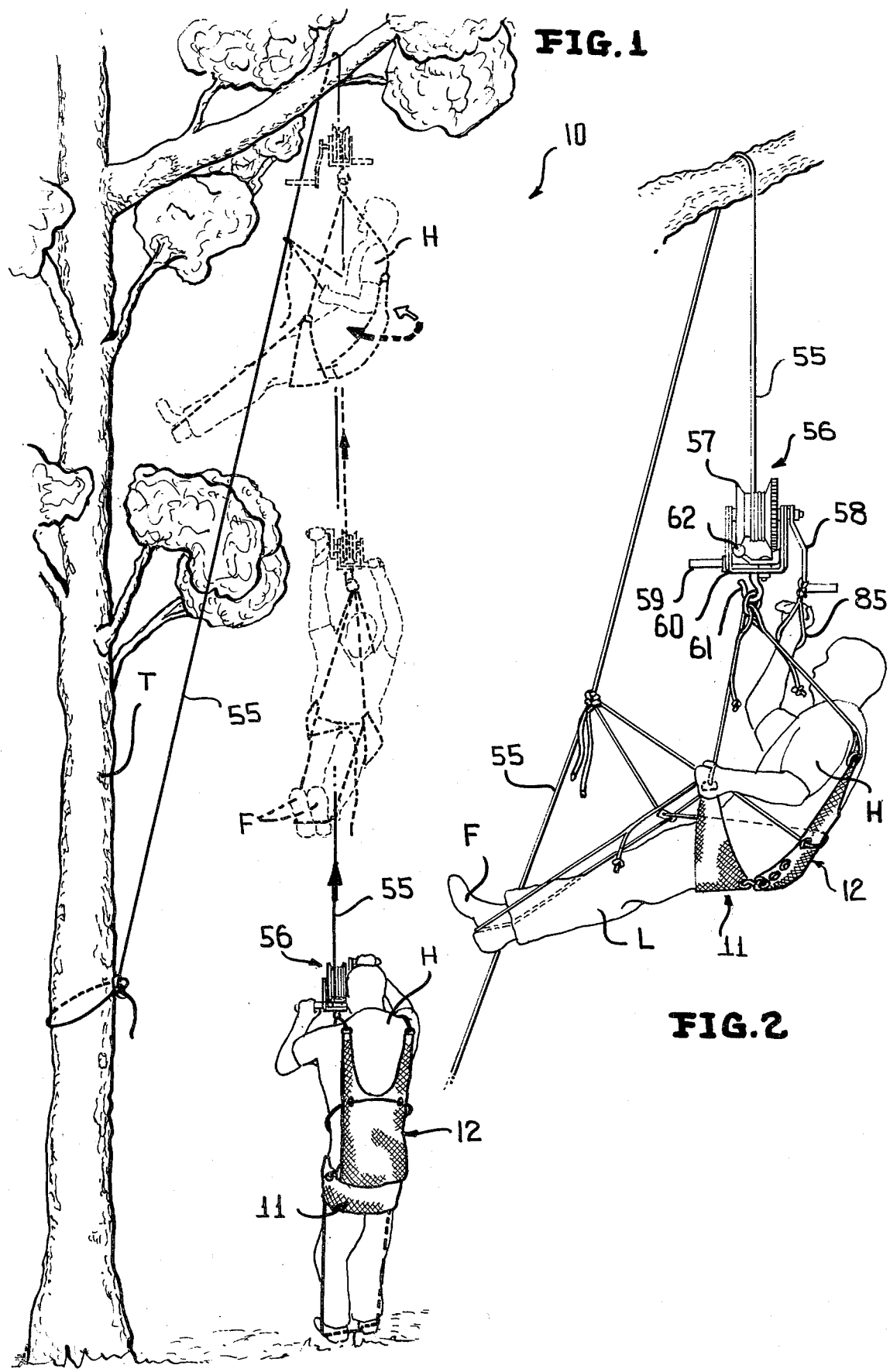

4,347,914

PORTABLE TREE SLING OR PORTABLE TREE STAND OR PORTABLE TREE HUNTING SLING, OR ALTERNATIVES THEREOF

Hunting tree stands are relatively well known and are generally utilized by hunters to elevate themselves an appreciable distance above ground which provides a larger range of sight, lessens detection through an animal smelling a human scent and/or generally positions the hunter well above the line of sight of many animals, such as deer, who normally do not look upwardly if danger is thought imminent. Such conventional tree stands usually take the form of either platform-type stands which might be self-climbing or they might be in the form of seats or chairs which are winched or hoisted to their positions of use, as, for example, disclosed in Sirls (U.S. Pat. No. 3,731,762 of May 8, 1973) and Hardy (U.S. Pat. No. 3,568,797 of May 9, 1971). The invention is an improvement over the latter-noted type tree stands, hunting chairs of sportsman's bases, specifically in providing a truly portable and extremely compact "tree stand" or sling which is essentially formed of a back rest, a foot rest and suitable rope, all of which can be folded or rolled into a compact package of extremely light weight to be carried on the back or belt, yet of remarkable versatility and efficiency.

In keeping with the present invention, the portable tree stand or sling includes not only a back rest and a seat rest formed of strong fabric, such as nylon or canvas, but a foot rest in the form of a rope is provided for supporting the feet and legs of a hunter seated upon and within the portable tree sling when the same is in its operative elevated position relative to a tree or like vertical support.

Still another object of this invention is to provide a novel portable hunting sling in which a rope is entrained through apertures of the back rest and may be tied to a hoisting rope, an associated tree, or the like and is manipulated to turn the portable tree sling through 360 degrees and hold the same in any position of rotation so that a hunter seated upon the portable tree sling can face any desired direction.

Still another object of this invention is to provide an novel portable tree stand or sling for hunting or other purposes, rescue, or the like, which further includes means for adjustably securing the back rest to the seat rest to change the size of the portable tree sling thereby accommodating hunters of different weights and posterior dimensions which results in a minimum of fatigue and a maximum of comfort, particularly over a long period of time suspended above ground which is not uncommon.

With the above and other objects in view that will hereinafter appear, the nature of the invention will be more clearly understood by reference to the following detailed description, the appended claims and the several views illustrated in the accompanying drawings.

IN THE DRAWINGS

FIG. 1 is a perspective view illustrating a novel portable tree stand or sling constructed in accordance with this invention, and illustrates in solid outline a hunter standing on the ground, next in phantom outline hoisting himself upwardly, and finally at a desired position of elevation above the ground.

FIG. 2 is a perspective view of the uppermost position shown in phantom outline in FIG. 1, and illustrates with more specificity the manner in which the portable tree sling supports the hunter.

Figure 3:
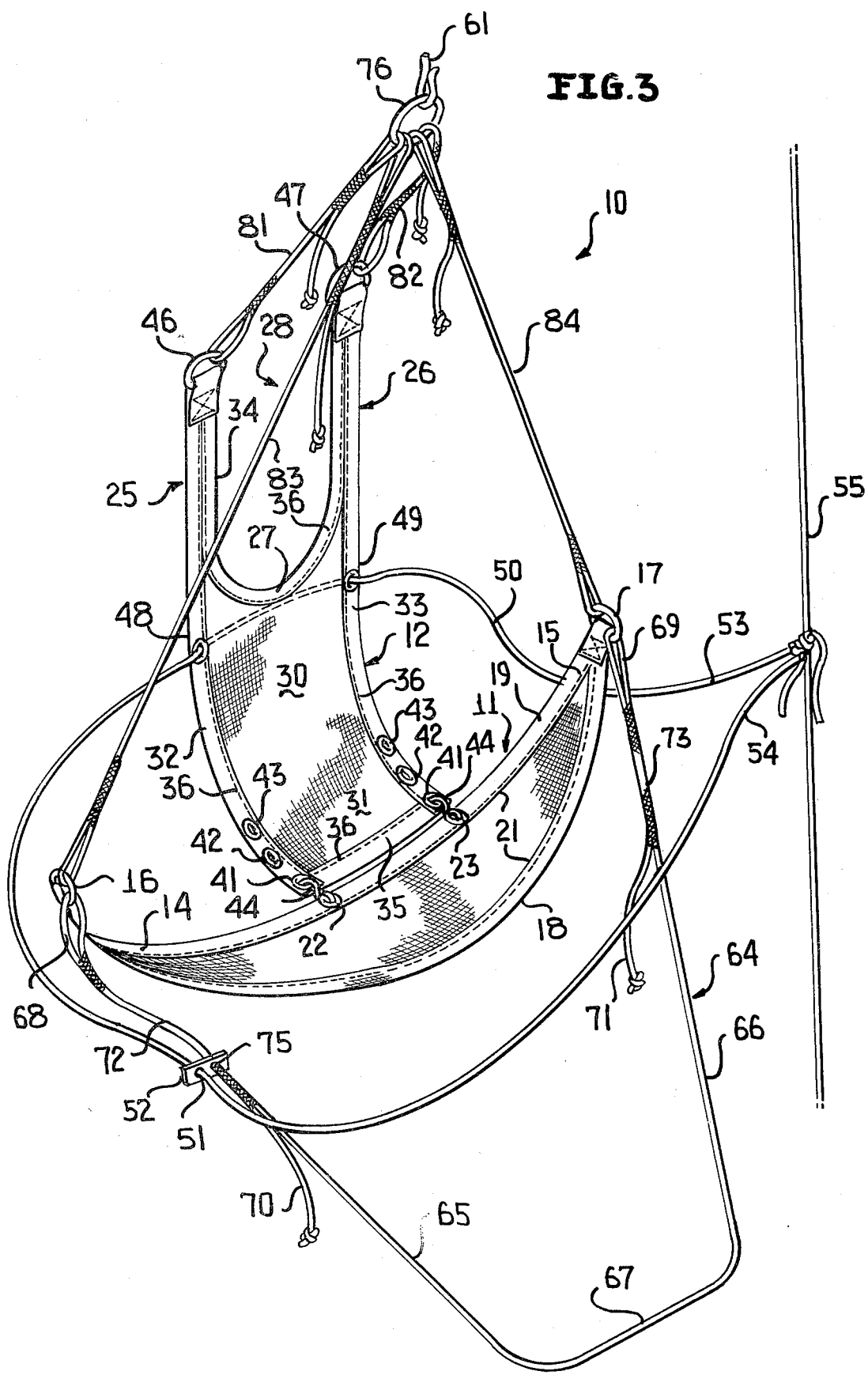

FIG. 3 is a perspective view of the portable tree stand or sling of this invention, and illustrates details of a back rest and a seat rest thereof, a foot rest rope carried by the latter, adjustable connecting means between the back rest and the seat rest, a rope for orienting the position of the sling through 360 degrees, and ropes for connecting the seat rest and the back rest to an eyelet or loop associated with a hoist.

A novel portable hunting tree stand or hunting sling constructed in accordance with this invention is generally designated by the reference numeral 10 and includes a seat rest 11 and a back rest 12 (FIG. 3), each of which is constructed from relatively strong fabric material, such as nylon, canvas, or the like.

The seat rest 11 (FIG. 3) includes a central relatively large seating area 13 which tapers in opposite directions toward opposite sides 14, 15, each of which are connected to respective metallic eyelets or rings 16, 17. A forward margin 18 and a rear margin 19 of the seat rest 11 is folded upon itself and sewn together with suitable stitching 21 to reinforce the overall seat rest, since the latter is subject to the greatest porportional weight of a hunter H (FIGS. 1 and 2) seated thereupon. Two metallic eyelets 22, 23 (FIG. 3) are formed in the reinforced rear margin 19 of the seat rest 11.

The back rest 12 includes an upper end portion (unnumbered) defined by a pair of upwardly directed legs or sides 25, 26 and a bight portion 27 which collectively define a yoke or slot 28. Beneath the bite 27 is a central lower back supporting zone or area 30 and therebeneath is a lowermost seating area 31 which cooperates with the central seating area 13 of the seat rest 11. Much as in the manner of the seat rest 11, the back rest 12 also includes overfolded margins 32 through 35 which are sewn together by stitching 36. Also similar to the provision of the eyelets 22, 23 and the seat rest 11, the back rest 12 is provided with three metallic eyelets 41 through 43. Identical S-shaped hooks 44 are illustrated being connected between the eyelets 41 and the eyelets 22, 23. However, the hooks 44 can also be connected between the eyelets 22, 23 and either of the remaining pair of eyelets 42, 42, or 43, 43 thereby functioning to adjust the overall size of the portable hunter sling 10. Obviously, the hooks and associated eyelets, as illustrated in FIG. 3, depict the largest "size" of the hunting sling 10 whereas should the hooks 44, 44 be hooked in the eyelets 43, 43, the latter would represent the smallest "size" of the hunting sling 10, thus accommodating the same for virtually any size individual, be the same small, large, old, etc.

The legs or sides 25, 26 are also connected to eyelets or rings 46, 47, and approximately midway between the eyelets 43, 43 and the eyelets 46, 47 there is an eyelet 48, 49 in the respected overfolded margins 32, 33 through which passes a rope 50, the function of which will be described more fully hereinafter. However, the rope 50 also passes through an aperture 51 of a plastic or metallic adjusting/locking plate 52, and ends 53, 54 of the rope 50 are knotted to a hoisting rope 55 which is part of a conventional hoist 56 (FIG. 2). Since the hoist 56 is conventional, it need only be noted that it includes a drum 57, a handle 58 for rotating the drum 57, a handle 59 carried by a bracket 60 for steadying the hoist with one hand while the handle 58 is being manipulated by the other, a hook 61 from which the hunting sling 10 is suspended, and a suitable latch 62 for locking and unlocking the drum 57 for winding the hoisting rope 55 upon the drum 57 or releasing the same therefrom, as will be more apparent hereinafter.

Means for supporting the feet F (FIGS. 1 and 2) and the legs L of a hunter H is in the form of a rope 64 having a pair of legs 65, 66, a bight 67, and opposite adjustable loops 68, 69 which are received in the respective rings 16, 17 of the seat rest 11. Ends 70, 71 of the foot rest rope 64 are intertwined between portions 72, 73 of the respective legs 65, 66 such that upon pulling the ends 70, 71, the legs 64, 65 can be shortened whereas releasing the ends 70, 71 and exerting pressure upon the bight 67 of the ropes 64 will cause slippage between the ends 70, 71 and the legs 65, 66 in the telescope portion 72, 73 thus overall lengthening the foot rest rope 64. In other words, in the areas 72, 73 the leg portion 65, 66 of the foot rest rope 64 can slide relative to the end portions 70, 71 thereby increasing or decreasing the overall effective length of the foot rest rope 64.

The portion 72 of the foot rest rope 64 also passes through an aperture 75 of the adjusting/locking plate 52, and this connection serves basically as a fulcrum or pivot point for the plate 52 such that in the position shown in FIG. 3, the rope 50 can easily slide through the opening 51, but upon the plate 52 being cocked or pivoted with its longitudinal axis generally in the plane of the portion 72, the rope 50 and particularly that portion thereof adjacent to plate 52 is bent to a generally S-shaped configuration and can not readily slide through the aperture 51 and thus effectively lock the rope 50 at any point of rotation of the sling 10 in the manner which will be described more fully hereinafter.

The tree stand sling 10 is suspended from a metallic eye or eyelet 76 by means of four suspension ropes 81 through 84 with the rope 81 being connected between the eyelets 46, 76, the rope 82 being connected between the eyelets 47, 76, the rope 83 being connected between the eyelets 16, 76, and the rope 84 being connected between the eyelets 17, 76. The eyelet 76 is, of course, connected to the hook 61 of the hoist 56.

OPERATION OF THE INVENTION

Reference is made to FIG. 1 of the drawings in which the portable tree sling 10 is shown in the lowermost figure in position upon the hunter H in association with the winch 56 for elevating the hunter H to the uppermost phantom outline positon in this same figure. However, before the elevating process can be begun, it should be appreciated that the hoisting rope 55 must first be tied to a convenient lower portion of a trunk T after being thrown over a branch or limb L. This is readily accomplished simply by weighting the end of the hoisting rope 55, throwing the same over the branch or limb L and then tying the same to the base (unnumbered) of the tree T adjacent ground level after which the hunter H can stand upon the bight 67 of the foot rest rope 64 and appropriately positon the seat rest 11 and the back rest 12 while taking up any slack in the hoisting rope 55 by merely rotating the handle 58 of the hoist 56 and thereby also rotating the drum 57.

The lowermost position in FIG. 1 shows the hunter H in a position preparatory to "lift-off" at which the hoisting rope 55 is relatively taut, the hunter H is standing upon the bight 67 of the foot rest rope 64, and his buttocks are relatively seated upon and within the portions 13 and 31 of the respective seat rest 11 and back rest 12. The hunter's hand is inserted within the loop of a rope 85 which is in turn connected to the handle 58 of the winch 56. This is a safety measure such that should the hunter H accidentally release the handle 58 while cranking himself upwardly or should the latch 62 become accidentally engaged when the hunter H is in the uppermost position in FIG. 1, the winch 56 cannot accidentally unwind resulting in the hunter H descending in an uncontrolled fashion. Thereafter, with one hand upon the stabilizing handle 59 and the other upon the handle 58, the hunter H begins rotating the handle 58 operating the hoist 56 in a conventional manner raising himself upwardly as indicated in the mid-position of FIG. 1 until final elevation is reached (uppermost position in FIG. 1).

During the time the hunter H leaves the ground until he reaches the uppermost position, his stability and direction is basically uncontrollable or is at least of very limited control depending upon the hunter's agility, sense of balance. However, once reaching the uppermost position in FIG. 1, he can then tie the ends 53, 54 of the rope 50 to the hoisting rope 55, as is illustrated in all of the figures of drawings or around the tree, depending on the tree. When thus tied to the hoisting rope 55, the hunter H can pull either strand or end 53, 54 during which time the rope will slide through the eyelets 48, 49 and will, of course, rotate the overall sling 10 either clockwise or counterclockwise until a desired position is reached at which point the sling can be locked in position in a conventional manner by the rope 50 interlocking with the plate 52. In this manner, the hunter H can alter his position through approximately 360 degrees and essentially face in any position desired.

Obviously, the ends 53, 54 of the rope 50 are untied and the latch 62 is unlatched when the hunter H decides to lower himself.

Although only a preferred embodiment of the invention has been specifically illustrated and described herein, it is to be understood that minor variations may be made in the apparatus without departing from the spirit and scope of the invention, as defined in the appended claims.

I claim:

1. A sling adapted to suspendingly support a seated person above the ground comprising means for defining a flexible seat rest and a separate flexible back rest, means for suspending said sling through a connection at least between said back rest and an associated support, means for defining a foot rest, said foot rest being a rope, and means for joining said rope to opposite sides of said seat rest whereby a person seated upon said seat rest will have his back and feet supported respectively by said back rest and said foot rest rope.

2. The sling as defined in claim 1 wherein said back rest includes an upper end portion remote from said seat rest, and said connection includes at least a pair of ropes each joined at a different position to said back rest upper end portion.

3. The sling as defined in claim 1 including means for selectively adjusting the length of said foot rest rope to accommodate people of varied length legs.

4. The sling as defined in claim 1 wherein said seat rest and back rest are each a separate piece of resilient material.

5. The sling as defined in claim 1 wherein said seat rest and back rest are each a separate piece of resilient material, and means for selectively adjustably connecting said seat rest and back rest to accommodate people of different upper body dimensions.

6. The sling as defined in claim 1 wherein said suspending means include another connection between each of said seat rest opposite sides and an associated support.

7. The sling as defined in claim 1 wherein said back rest includes an upper end portion remote from said seat rest, said connection includes at least a pair of ropes each joined at a different position to said back rest upper end portion, and said suspending means includes another connection means in the form of another pair of ropes each joined between one of said seat rest opposite sides and an associated support.

8. The sling as defined in claim 1 including means for adjustably connecting said sling to an associated support for holding said sling in any position of rotation through 360 degrees.

9. The sling as defined in claim 1 including means for adjustably connecting said sling to an associated support for holding said sling in any position of rotation through 360 degrees, said adjustable holding means including a second rope adapted to be tied to an associated support, and means for selectively adjusting the length of said second rope between said sling and the point of tying to thereby hold the sling in any position of rotation thereof.

10. The sling as defined in claim 1 including means for adjustably connecting said sling to an associated support for holding said sling in any position of rotation through 360 degrees, said adjustable holding means including a second rope adapted to be tied to an associated support, means for selectively adjusting the length of said second rope between said sling and the point of tying to thereby hold the sling in any position of rotation thereof, and said selective adjusting means being an adjustable connection between said second rope and said foot rest rope.

11. The sling as defined in claim 3 wherein said seat rest and back rest are each a separate piece of resilient material, and means for selectively adjustably connecting said seat rest and back rest to accommodate people of different upper body dimensions.

12. The sling as defined in claim 3 wherein said back rest includes an upper end portion remote from said seat rest, said connection includes at least a pair of ropes each joined at a different position to said back rest upper end portion, and said suspending means includes another connection means in the form of another pair of ropes each joined between one of said seat rest opposite sides and an associated support.

13. The sling as defined in claim 11 wherein said back rest includes an upper end portion remote from said seat rest, said connection includes at least a pair of ropes each joined at a different position to said back rest upper end portion, and said suspending means includes another connection means in the form of another pair of ropes each joined between one of said seat rest opposite sides and an associated support.

14. The sling as defined in claim 11 including means for adjustably connecting said sling to an associated support for holding said sling in any position of rotation through 360 degrees.

15. The sling as defined in claim 11 including means for adjustably connecting said sling to an associated support for holding said sling in any position of rotation through 360 degrees, said adjustable holding means including a second rope adapted to be tied to an associated support, and means for selectively adjusting the length of said second rope between said sling and the point of tying to thereby hold the sling in any position of rotation thereof.

16. A sling adapted to suspendingly support a seated person above the ground comprising means for defining a seat rest and a back rest, means for suspending said sling through a connection at least between said back rest and an associated support, and means for adjustably connecting said sling to an associated support for holding said sling in any position of rotation through 360 degrees.

17. The sling as defined in claim 16 wherein said adjustable holding means includes a rope adapted to be tied to an associated support, and means for selectively adjusting the length of said rope between said sling and the point of tying to thereby hold the sling in any position of rotation thereof.

18. The sling as defined in claim 17 including another rope carried by said sling, and said adjustable holding means further includes an element having a pair of holes each receiving one of said ropes.

19. The sling as defined in claim 17 wherein said seat rest and back rest are each a separate piece of resilient material, and means for selectively adjustably connecting said seat rest and back rest to accommodate people of different upper body dimensions.

20. The sling as defined in claim 17 wherein said back rest includes an upper end portion remote from said seat rest, said connection includes at least a pair of ropes each joined at a different position to said back rest upper end portion, and said suspending means includes another connection means in the form of another pair of ropes each joined between one of said seat rest opposite sides and an associated support.

21. The sling as defined in claim 19 wherein said back rest includes an upper end portion remote from said seat rest, said connection includes at least a pair of ropes each joined at a different position to said back rest upper end portion, and said suspending means includes another connection means in the form of another pair of ropes each joined between one of said seat rest opposite sides and an associated support.

22. A sling adapted to suspendingly support a seated person above the ground comprising a flexible seat rest and a separate flexible back rest having an upper edge portion and opposite side portions, respectively, a rope connected to each seat rest side portion and a pair of ropes each joined at a different position to said back rest upper edge portion; means for commonly connecting said ropes together whereby said sling is adapted to be connected to a winch and an associated line for elevating said sling relative to and suspending said sling from an associated support, means for adjusting the length of said ropes, another rope defining a foot rest and having ends thereof connected to said seat rest opposite sides, and means for adjusting the length of said foot rest rope.

23. The sling as defined in claim 22 wherein said seat rest and back rest are each a separate piece of resilient material, and means for selectively adjustably connecting said seat rest and back rest to accommodate people of different upper body dimensions.

24. The sling as defined in claim 22 including means for adjustably connecting said sling to an associated support for holding said sling in any position of rotation through 360 degrees.

25. The sling as defined in claim 22 including means for adjustably connecting said sling to an associated support for holding said sling in any position of rotation through 360 degrees, said adjustable holding means including a second rope adapted to be tied to an associated support, and means for selectively adjusting the length of said second rope between said sling and the point of tying to thereby hold the sling in any position of rotation thereof.

26. The sling as defined in claim 23 including means for adjustably connecting said sling to an associated support for holding said sling in any position of rotation through 360 degrees, said adjustable holding means including a second rope adapted to be tied to an associated support, and means for selectively adjusting the length of said second rope between said sling and the point of tying to thereby hold the sling in any position of rotation thereby.

* * * * *